United States Patent [19]
Goodall

[11] 3,991,268
[45] Nov. 9, 1976

[54] PCM COMMUNICATION SYSTEM WITH PULSE DELETION

[75] Inventor: William M. Goodall, Oakhurst, N.J.

[73] Assignee: Bell Telephone Laboratories, Incorporated, Murray Hill, N.J.

[22] Filed: Dec. 24, 1948

[21] Appl. No.: 67,210

[52] U.S. Cl. .............................. 178/22; 179/15 AP; 179/15 AF
[51] Int. Cl.² ........................ H04L 9/00; H04K 1/00
[58] Field of Search ................ 179/1.5 PO, 15.6 PC, 179/1.5, 15.6; 250/9.22 X, 20.282, 9.21, 13, 9.22; 332/9-15; 343/13, 110; 178/43.5, 22

[56] References Cited

UNITED STATES PATENTS 2,412,964 12/1946 Chatterjea et al. ............ 179/15 AP
2,531,846 11/1950 Goodall ......................... 179/15 AP

*Primary Examiner*—Howard A. Birmiel
*Attorney, Agent, or Firm*—W. F. Simpson

EXEMPLARY CLAIM

1. A pulse code modulation system, including a source of intelligence conveying code groups of pulse elements of pulse code modulated signals, apparatus for suppressing individual pulse elements of said code groups of pulse elements of said pulse code modulated signals at recurring intervals of time, means for transmitting other signals during said intervals during which said pulses are suppressed, and receiving apparatus for recovering said other signals from said pulse code modulation signals.

9 Claims, 8 Drawing Figures

Figure 1:
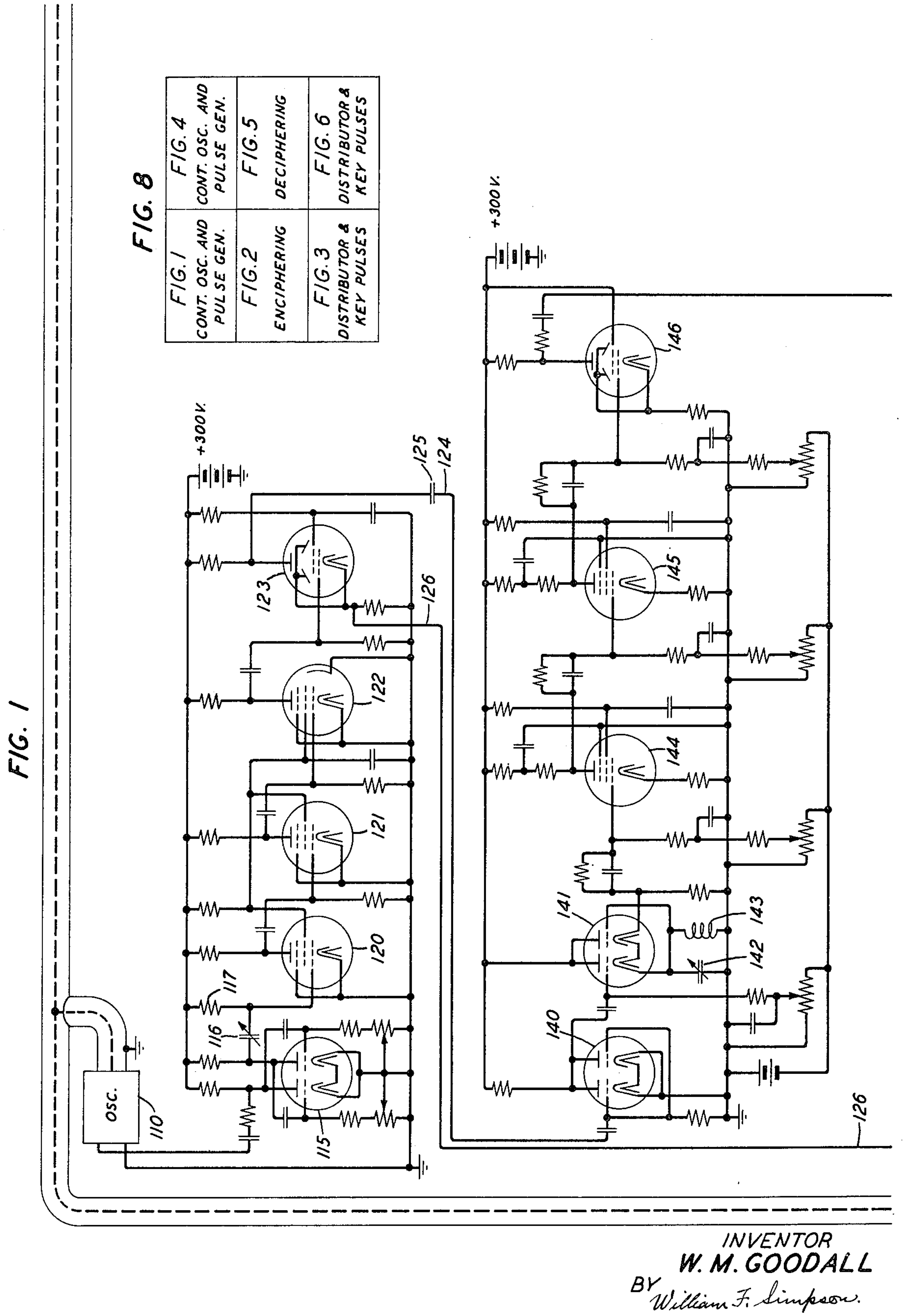

INVENTOR
W. M. GOODALL
BY William F. Simpson

INVENTOR
W. M. GOODALL
BY William F. Simpson.

INVENTOR
W. M. GOODALL
BY William F. Simpson

INVENTOR
W. M. GOODALL
BY William F. Simpson.

INVENTOR
W. M. GOODALL
BY William F. Simpson.
ATTORNEY

INVENTOR
W. M. GOODALL
BY William F. Simpson

INVENTOR
W. M. GOODALL
BY William F. Simpson

PCM COMMUNICATION SYSTEM WITH PULSE DELETION

This invention relates to methods and apparatus for enciphering and deciphering signaling currents and more particularly to the enciphering and deciphering pulse code groups of signaling currents or conditions employed in the transmission of message or intelligence conveying signals as well as supervisory or other non-intelligence conveying signals.

The invention relates more particularly to high-speed pulse code systems in which pulses of short duration occur in very rapid succession. In the past, the enciphering and deciphering equipment had to work at substantially the same speed as the pulse systems. Such a requirement imposes a considerable limitation on the types of systems and equipment available for generating and utilizing ciphered keys or key codes employed in enciphering and deciphering the signaling currents.

It is an object of the present invention to overcome some of these difficulties and provide improved enciphering and deciphering equipment by employing a plurality of key generators comprising tapes or other suitable equipment for enciphering various portions of the signaling currents. By providing a plurality of such key generators and employing them in rotation, sufficient time is provided between the times these generators are employed to encipher or decipher the signaling currents to advance them in any suitable or desired manner. In this way each one of the key generators may be operated at a much lower speed and at the same time be capable of enciphering or deciphering high-speed code signaling pulses.

By providing a plurality of said ciphered keys or key generators each of which may be independent of all of the others, if desired the degree of secrecy obtained is much greater than that obtained from a single key generator of comparable complexity.

Another object of this invention relates to methods, apparatus and circuits for taking one of the pulse intervals at recurring intervals of time and employing this pulse interval for the transmission of auxiliary signals other than the pulse code signals. By taking the pulse at intervals or instants not related to the code group intervals some privacy is obtained for both the pulse code signals and also the auxiliary signals.

A feature of the invention relates to an improved distributor arrangement for sequentially connecting the various key sources to the enciphering equipment, one after another and in rotation to the enciphering or deciphering equipment.

Another feature of the invention relates to improved enciphering equipment in which signals of enciphering pulses, as well as complementary signals are obtained and then in particular, one of these groups of test signals is selected for transmission under control of the key generating equipment.

Another feature of this invention relates to a similar method and equipment for deciphering the received signals under control of a similar plurality of key generators or key signals.

Another feature of this invention relates to cipher equipment which may be applied to existing pulse code modulation systems without requiring any change of these existing systems.

Another feature of this invention relates to cipher equipment which may be interposed between the ends of a pulse code modulation path to render secret the signals transmitted between the ciphering equipment and deciphering equipment.

The foregoing objects and features of this invention may readily be understood by reference to the attached drawings in which FIGS. 1 to 6 inclusive show the circuits and apparatus, in detail, of an exemplary embodiment of the present invention.

Figure 5:
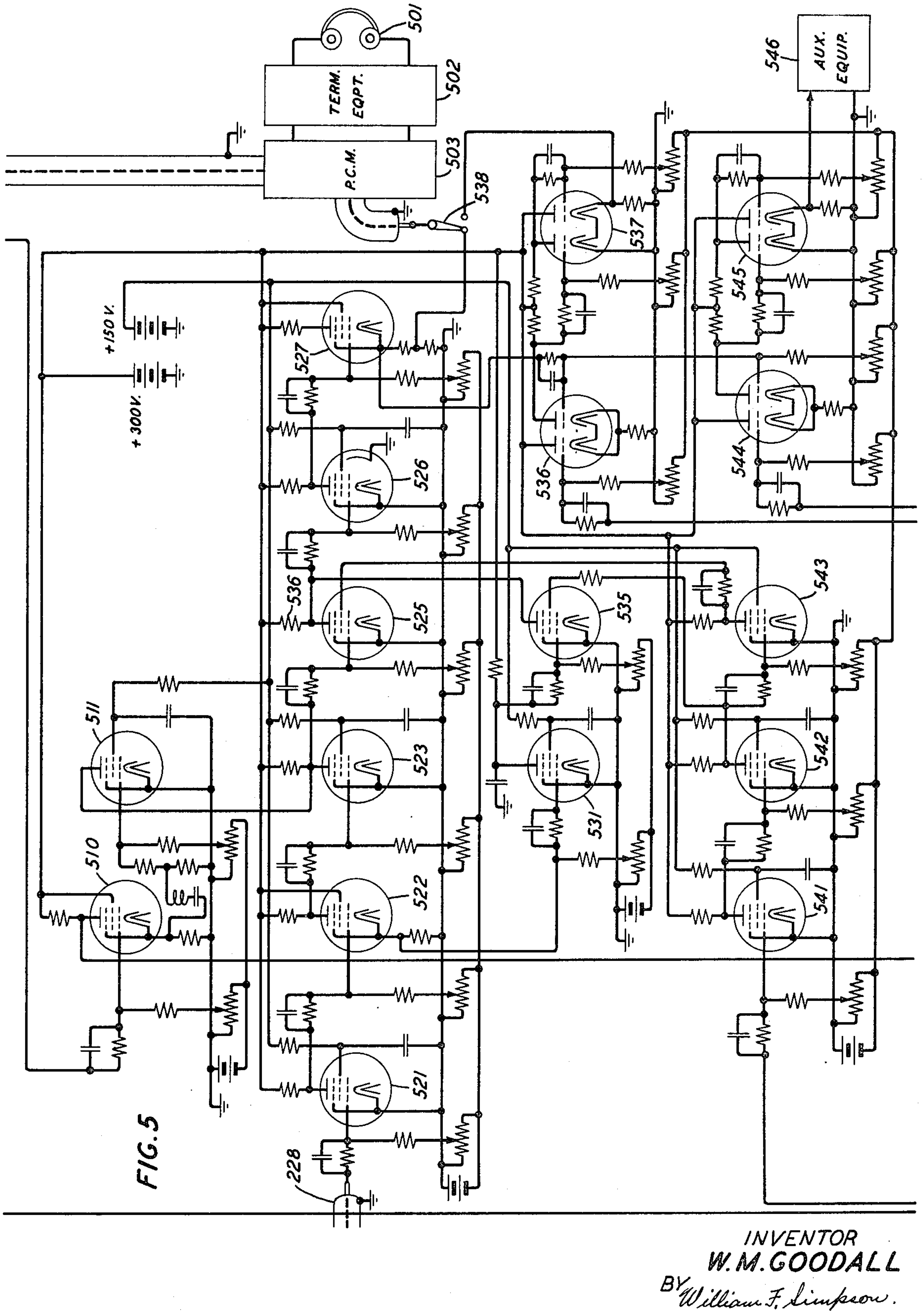
Figure 6:
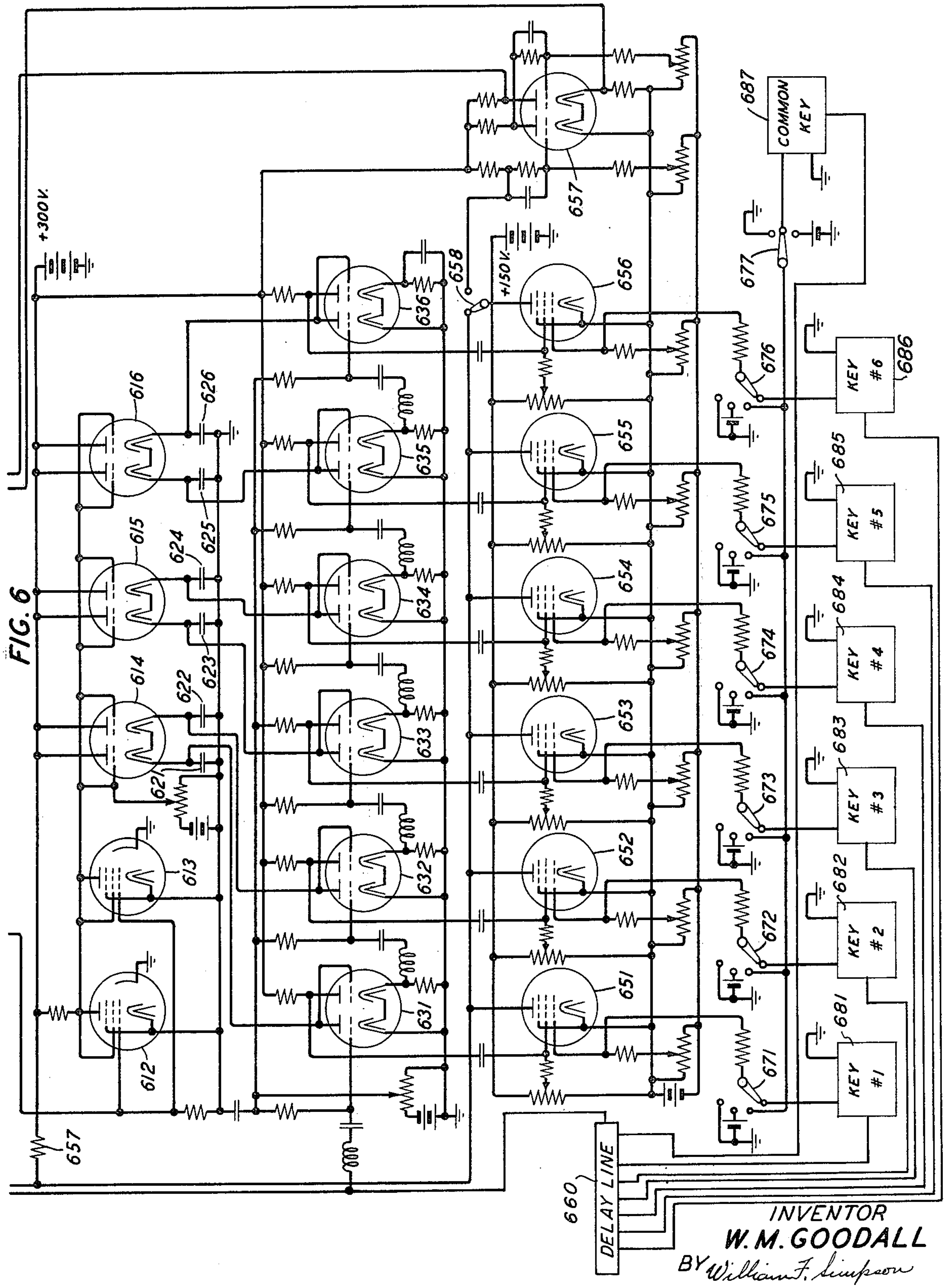
Figure 7:
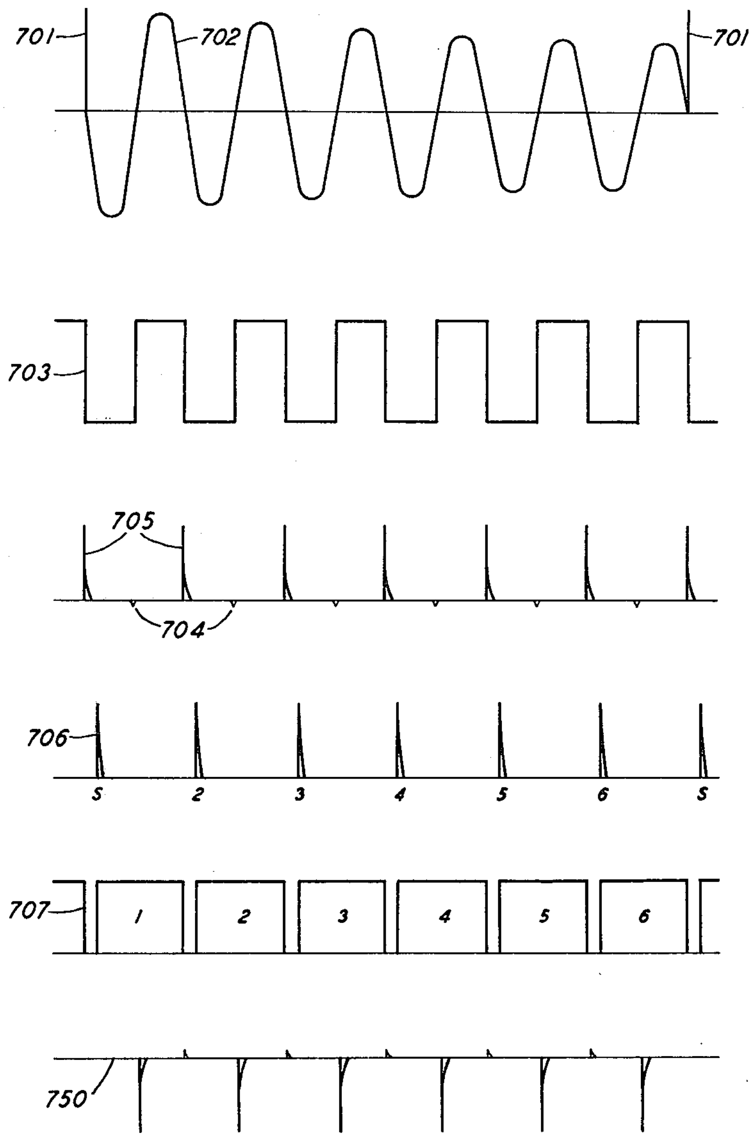

FIG. 7 shows graphs of the voltage or current as applied to certain portions of the system and FIG. 8 shows the manner in which FIGS. 1 to 6 are positioned adjacent one another to form the complete system. FIG. 8 also shows the manner in which the various component parts cooperate one with the other in accordance with an exemplary method and system embodying the present invention.

The invention is not limited to the exemplary system shown in detail in the drawings so that this exemplary system does not limit or expand the scope of the claims appended hereto, which point out in detail the novel features of the present invention.

Figure 2:
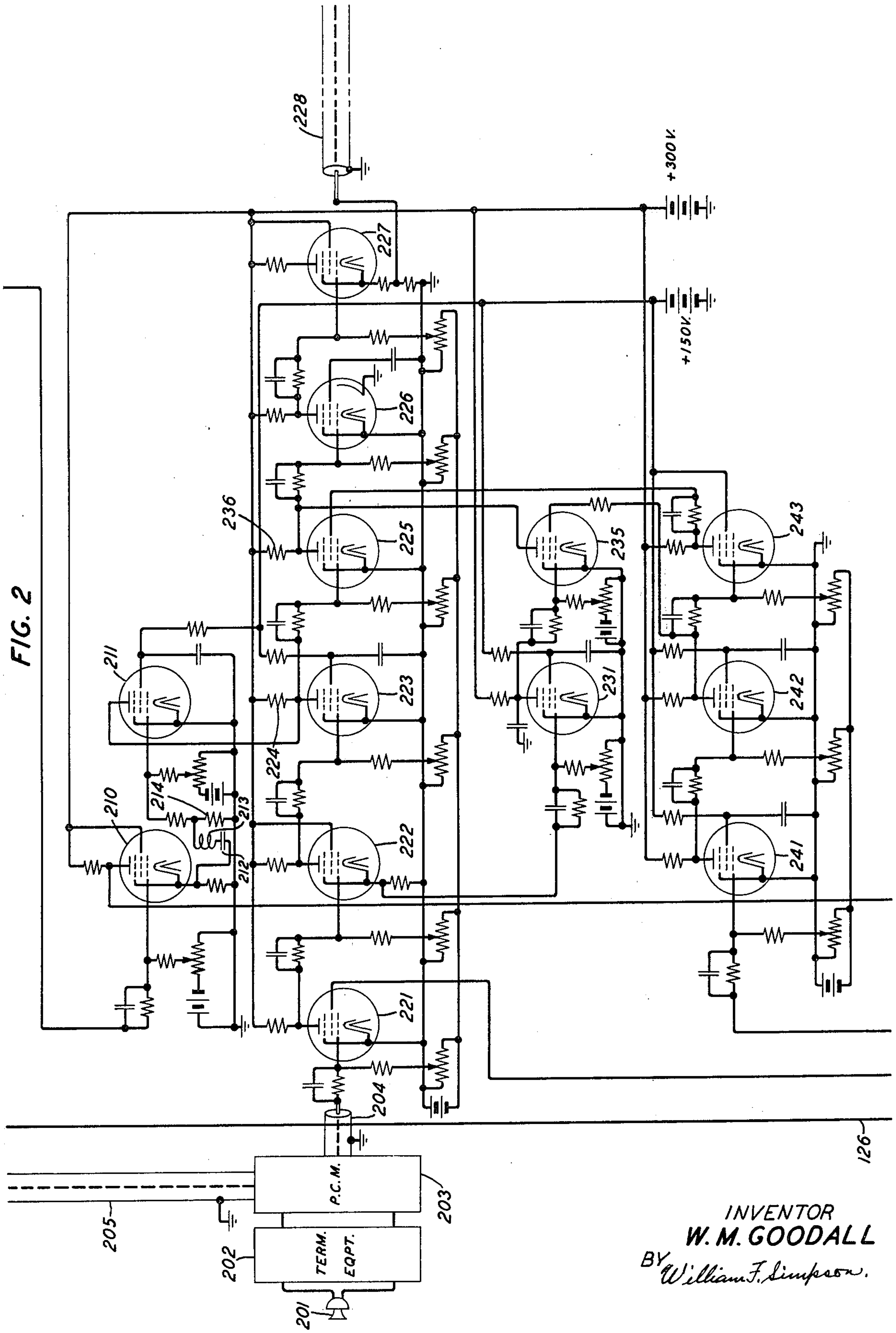
Figure 3:
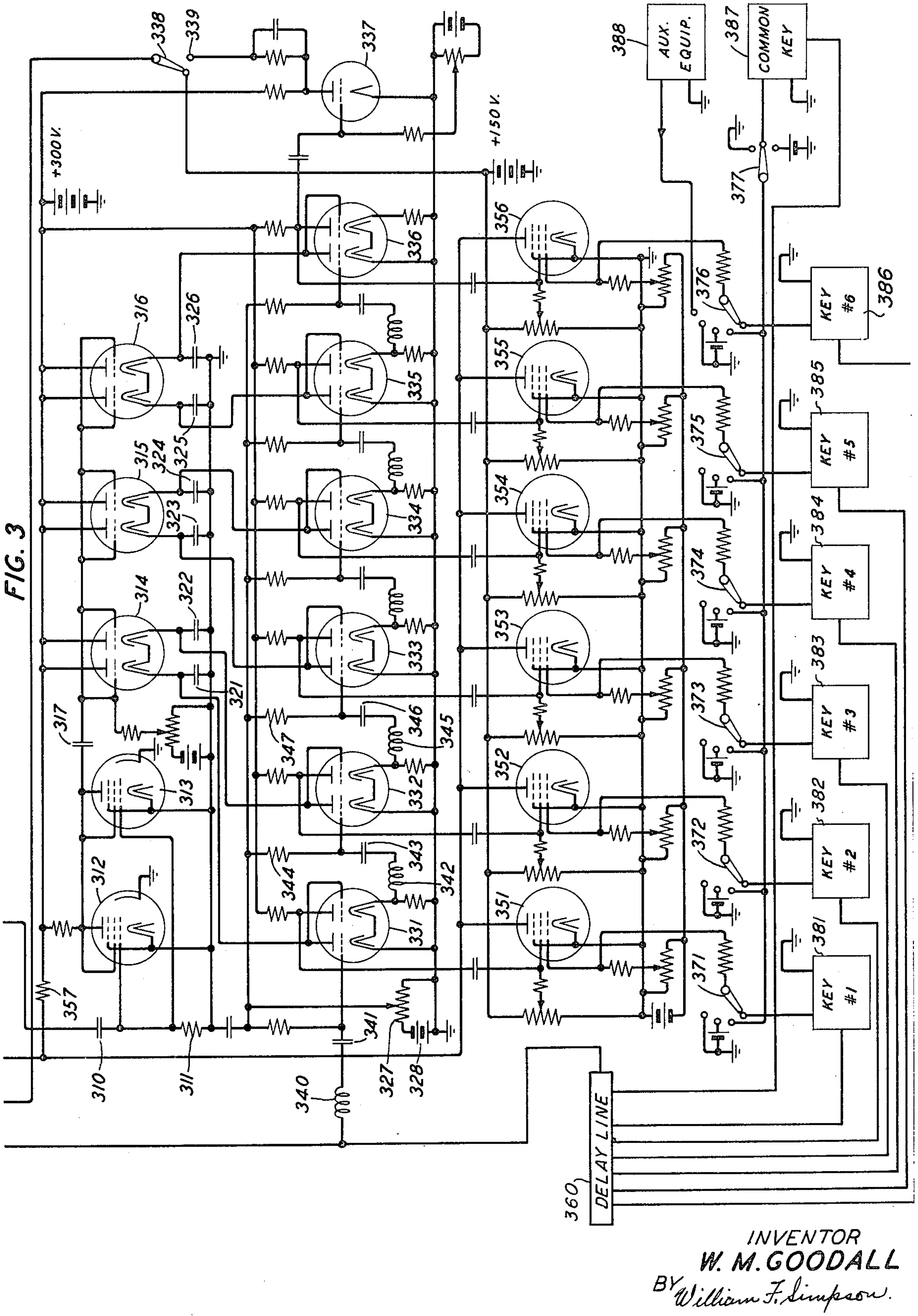
Figure 4:
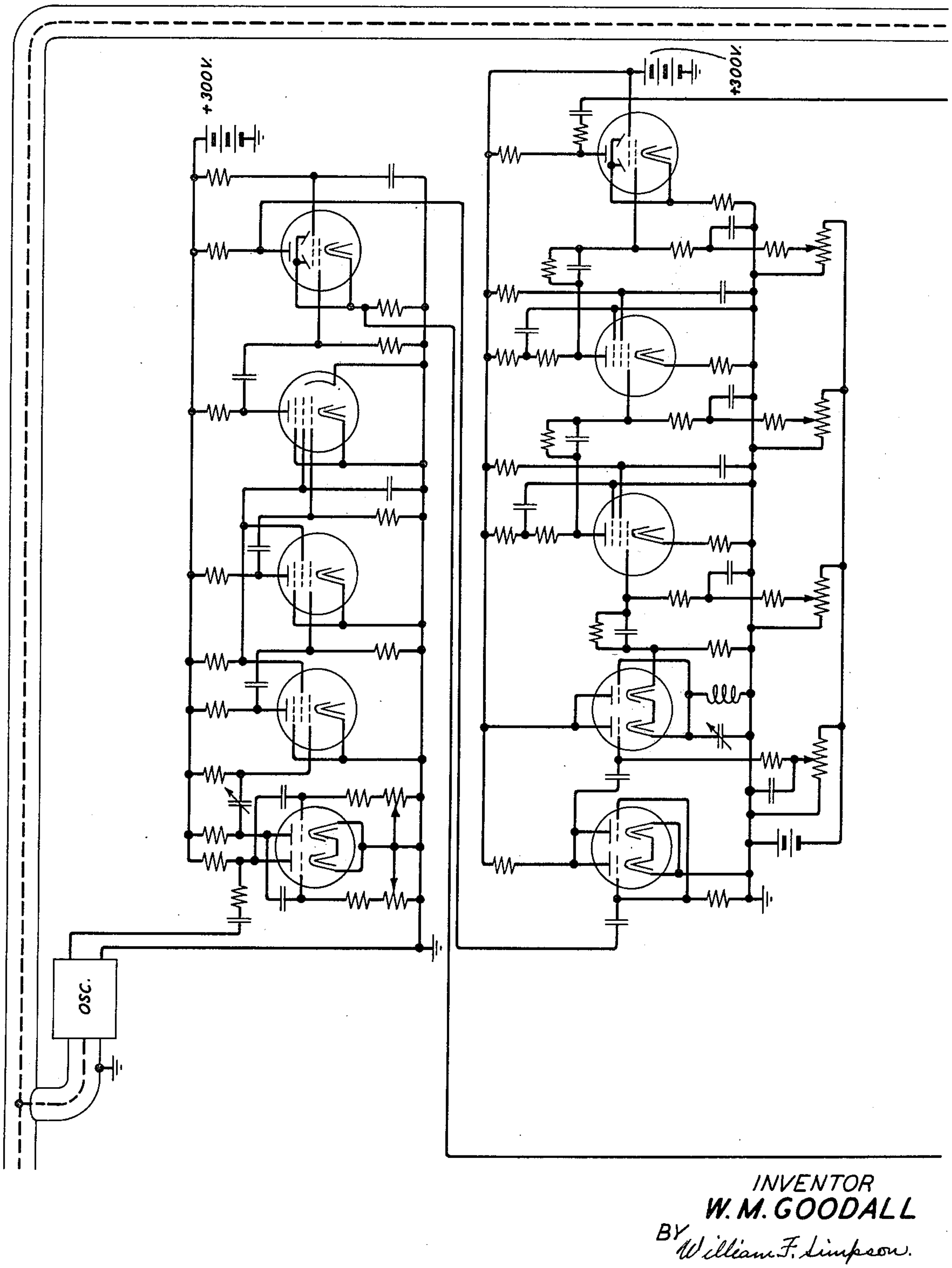

Referring now to FIGS. 1 to 6 of the drawings when arranged as shown in FIG. 8, it should be noted that enciphering equipment and circuits are shown in FIGS. 1, 2 and 3, while the deciphering equipment is shown in FIGS. 4, 5 and 6.

FIG. 1 shows main synchronizing and timing equipment while FIG. 3 shows a distributor comprising a plurality of electron discharge tubes which are employed to sequentially connect a plurality of sources of key signals for the purpose of enciphering message signals.

FIG. 2 indicates a transmitting terminal of a pulse code modulation system together with circuits and equipment for enciphering the message signals in accordance with the key signals received from the distributor equipment in FIG. 3.

In accordance with the present invention the only relation necessary or desirable between the key signals as received from FIG. 3 and pulse code modulation signals from the pulse coded terminal is that the key signals should not change during any pulse element of the pulse code modulation signals. It is not essential that the number of key generators bear any relationship to the number of pulses or pulse intervals in the codes employed in a pulse code modulation system. Neither do the key signals as received from FIG. 3 have to change for each pulse interval of a pulse code modulation system. The key signals may remain the same for any desired integral number of pulse code pulse intervals. For example, the key signals from FIG. 3 may change or not change at the end of each pulse interval of a pulse code modulation system or at the end of every two pulse intervals or at the end of each pulse code group of the pulse code modulation system, or after any desired number of pulse code or pulse group intervals of the pulse code modulation system.

For descriptions of key generating equipment and methods of controlling and synchronizing such equipment reference is made to my copending application Ser. No. 67,209 filed Dec. 24, 1948 and to an application of Edson-Gleichmann-Mallinckrodt Ser. No. 675,901 filed June 11, 1946.

Said applications disclose electronic means for generating high-speed key signals for enciphering and deciphering pulse code modulation signals which key signals are of the type suitable for use in combination with the other elements of the exemplary system described herein for first enciphering and then, at the receiver or subsequent point in the system, for deciphering the enciphered signals and deriving the original pulse code modulation signals therefrom.

The key cipher signal generators as disclosed in said application of Edson-Gleichmann-Mallinckrodt employ crystal oscillators to control stepping or operation of the key generating system. In addition to the crystal-controlled oscillator two ring circuits, a 5-stage ring and an 8-stage ring are driven by this oscillator. These ring circuits are connected to two enciphering ring circuits, one comprising thirteen stages and the other eleven stages. The connection between the 5- and 8-stage rings and the 11- and 13-stage rings is by means of manually adjustable switching devices. The 5- and 8-stage rings are continuously driven by the crystal oscillator. The crystal oscillator also controls a pulse generating circuit which generates pulses from the crystal oscillator and causes pulses to be delivered to the 11- and 13-stage rings through gate circuits. The gate circuits are activated by pulses from the 5- and 8-stage rings through the manually settable switches. Thus the 11- and 13-stage ring circuits do not uniformly advance. Neither is the advance of the two rings similar or simultaneous. On occasions they may be substantially simultaneously advanced, while on other occasions only one or the other of these ring circuits may be advanced. The outputs of the two ring circuits are combined to form the key cipher signals.

As shown in FIG. 3 a common cipher key generator 387 may be employed when desired. This common key generator may be supplied with controlling pulses for synchronizing its oscillator, which oscillator may operate at a frequency such that the key cipher generator 387 may cause its output to change or not to change at the end of each pulse interval of the pulse code modulation system or at the end of every two pulse intervals, or at the end of each pulse code group of the pulse code modulation system or after any desired number of pulse code or pulse group intervals of the pulse code modulation system.

In an effort to facilitate the understanding of the invention and also in an effort to simplify the disclosure and the description thereof it will be assumed that this key generator 387 is arranged so that the output signals therefrom may or may not change at the end of each code group of pulses of the pulse code modulation system. Under the assumed conditions the controlling oscillator of this key generator will operate at substantially the same frequency as the frequency of the oscillator controlling the pulse code modulation systems or at the same frequency as oscillator 110 of the enciphering equipment. The supply of signals for advancing or actuating the key generator 387 thus may come from the output of the pulse generator over conductor 126. The controlling pulses are delayed by a portion of the delay line 360 to accurately time them with respect to the pulse code modulation pulses. With the key generator 387 so arranged the input controlling or advancing signals will be at substantially the same interval or frequency as the signals from conductor 126. The key generator will then advance and change or not change its output at these times.

The key generators 381 through 386, inclusive may be of a similar type and advanced by means of similar pulses. HOwever, in order to more clearly describe applicant's invention and as set forth herein, it is assumed that these key generators will be operated at one sixth of a frequency of the code pulse modulation signals. In other words for each sixth pulse interval of the pulse code modulation system a single driving or advancing pulse is supplied to these key generators 381 through 386, inclusive. Inasmuch as oscillator 110 is operating at such a frequency, these driving pulses may be obtained from delay line 360 which is supplied with pulses from the oscillator 110 over conductor 126. The delay line or device 360 is provided to time the advance of the key generators 381 through 386 and thus cause the successive advances of these devices.

It is not essential that the number of key generators 381 through 368 be the same as the number of pulse elements of each or any of the code combinations of the pulse code modulation system. The driving pulses for these key generators will of course be supplied by oscillators of these devices which oscillators will run at such a frequency to produce key signals at one sixth the frequency of the pulse code modulation pulses, assuming that six key generators are employed. Oscillator 110 operates at such a frequency. Of course, it is not necessary that the key generators operate at one sixth the frequency of the pulse code modulation signals. When desired these devices may be operated still slower.

The controlling oscillators of the key generators cause these generators to advance — usually step by step. However, the output from these devices does not change on each step and usually does not change in accordance with any regular program or in accordance with any pattern. These key generators are arranged so that their output is reproducible but otherwise as unpredictable and random as possible. The controlling oscillators however do control the times at which the outputs of these devices can change — when and if they have advanced to a point or position to make a change. Both of said copending applications are assigned to the Bell Telephone Laboratories, Incorporated, assignee of this application.

It is also assumed that the various keys 338, 538, 658, 371 through 377, inclusive, and 671 through 677, are set in the positions shown in the drawing.

While the above assumptions are not essential to the operation of the exemplary system described herein and in no way limit the scope of the invention, the exemplary system will be described as operating under such assumed conditions.

As shown in FIG. 2, microphone 201 represents a source of complex waves such as speech waves, music, telegraph signals, picture signals, and the like. For convenience it has been illustrated as a microphone but any other suitable transmitting device capable of transmitting the desired type of signals may be employed.

The microphone or other suitable source 201 is connected through terminal equipment 202 to a pulse code transmission modulation equipment 203.

Terminal equipment 202 may comprise any desired and suitable transmission equipment and signaling paths which are capable of transmitting a complex wave form comprising the signals as generated by the transmitting device 201. This terminal equipment may include telephone and telegraph and other types of switching exchanges and equipment including manual exchanges as well as dial or automatically operated switching systems. It may include toll lines or toll systems including open-wire lines, cable circuits, carrier current circuits including coaxial transmission paths, radio transmission path including microwave radio beams or other high frequency currents propagated in wave guides, etc. This equipment may include any combination of the above equipment including repeaters, regenerative repeaters, amplifiers, and suitable terminating and interconnecting equipment. This terminal equipment also may include gain regulators, level compensators, limiting equipment, etc., while are frequently employed in any of the above types of transmission paths or systems.

The pulse code modulation equipment 203 may comprise any suitable types of pulse code modulation equipment such as disclosed in my U.S. Pat. No. 2,449,467 granted Sept. 14, 1948 and No. 2,438,908 granted Apr. 6, 1948, or any other suitable type of pulse code modulation equipment. In order to simplify the disclosure and description of the exemplary system disclosed herein, it is assumed that terminal equipment 203 may be of the type disclosed in my above-identified patents, when said equipment is arranged to transmit code groups of pulses comprising six pulses, each pulse of which may comprise either one of two different signaling conditions.

As set forth in my above-identified patents, the pulse code modulation equipment transmits the pulse code modulation signals over one path such as 204 while synchronizing signals or pulses are transmitted over a transmission path 205. The synchronizing pulses transmitted over 205 comprise one pulse for each code group as described in my above-identified patents. It is to be understood however, that any other suitable synchronizing equipment may be employed including synchronizing circuits and apparatus which are controlled by received pulse code modulation signals.

In the usual case the enciphering equipment shown in FIGS. 1, 2 and 3 will be located at the same place as the pulse code modulation equipment 203. However, it need not be so located but may be located at any other suitable or desirable location or place near to or at some distance from pulse code modulation equipment 203.

In case the equipment shown in FIGS. 1, 2 and 3 is located at the same place as the pulse code modulation equipment 203, the oscillator 110 need not be provided because the controlling oscillator of the pulse code modulation system may be employed to control the common equipment. In addition, the common equipment shown in FIG. 1 will probably not be necessary since the corresponding equipment of the pulse code modulation system of the type described in my above-identified patents may supply the necessary pulses. However, in case the enciphering equipment shown in FIGS. 1, 2 and 3 is located at a distance from pulse code modulation equipment 203 or in case some other types of pulse code modulation terminal equipment is provided, it is desirable to provide control oscillator 110 as shown in FIG. 1 which oscillator is controlled by synchronizing signals or by the pulse code modulation signals themselves if it is desired to employ these signals for synchronizing purposes as well as for transmitting the intelligence or communication conveyed pulses of signals.

The local oscillator 110 as shown in FIG. 1 may include suitable types of frequency stability devices such as quartz crystals, limiters, frequency multipliers, frequency dividing circuits and equipment, phase control apparatus and the like, so that the output circuit of this oscillator which may be used for controlling the enciphering equipment shown in FIGS. 1, 2 and 3. In the exemplary embodiment described herein, it is assumed that the frequency received from oscillator 110 is such that during each code group of pulses one cycle is received from the oscillator 110. Furthermore, it is assumed that the phase of the output frequency is such that each cycle begins at the beginning of the code groups of the pulse code modulation system although it need not, but may begin between any two pulse intervals of the pulse code modulation system as pointed out above.

As shown in FIG. 1, the output of oscillator 110 is employed to control the multivibrator circuit comprising both sections of tube 115 in a well-known manner. The output of the multivibrator is obtained through condenser 116 connected to the anode of the right-hand section of tube 115. The condenser 116 and resistor 117 are employed to control the length of the output pulse from multivibrator 115 which is applied to the control grid of tube 120. The condenser 116 and resistor 117 are so chosen that they, in effect, differentiate the output of the right-hand section of tube 115 and control the length of the pulses applied to the control grid of tube 120 without in any way disturbing the frequency or period or in any other way interfering with the operation of the multivibrator of the circuit comprising both sections of the tube 115.

Tubes 120, 121 and 122 and their related circuits and equipment are employed to amplify, limit and otherwise shape the pulses applied to the control element of tube 120. The output tube 123 is provided for applying a negative synchronizing pulse to the lead 124 through the coupling condenser 125. The output tube 123 also simultaneously applies a positive synchronizing pulse to lead 126.

The negative synchronizing pulse applied to lead 124 is amplified by both sections of tube 140 and due to the inverting action of this tube the negative synchronizing pulse appears as a positive pulse in the output or anode circuit of tube 140. These positive pulses are represented by lines 701 of FIG. 7. One of these pulses is generated for each pulse code group.

The application of a positive synchronizing pulse to the left-hand control grid of tube 141 causes the upper terminal of condenser 142 to be charged to substantially the same potential as the positive pulse applied to the control grid of the left-hand section of this tube. The bias normally applied to the left section of tube 141 is such that upon the termination of the positive synchronizing pulse applied to its control grid, the left-hand section of tube 141 causes to conduct current and thus does not in any way alter or interfere with the potential of upper terminal condenser 142. Condenser 142 thereupon starts to discharge through inductance 143. However, condenser 142 and the inductor 143 comprise a resonant circuit so that upon the discharge of condenser 142 into the inductance 143 a damped oscillating current is set up which flows between these elements of the oscillating circuit. The wave 702 of FIG. 7 represents the potential of the upper terminal of condenser 142 due to this oscillating current. Tubes 144 and 145 are employed to amplify, limit and otherwise shape the wave form of the oscillating current so that substantially a square or rectangular wave form is supplied to control grid of the output tube 146. The output of tube 146 is amplified and further shaped by tube 210 which causes a substantially square or rectangular wave form to flow in its output circuit which is illustrated by the curve 703 of FIG. 7. A similar wave form but of opposite phase or polarity also appears on the cathode of tube 210. These wave forms are employed to control the circuit in the manner described hereinafter.

Distributor Circuit

The output circuit or anode of tube 210 is coupled through the coupling condenser 310 to the control elements so control grids of tubes 312 and 313 in parallel. Tubes 312 and 313 are employed as output tubes to secure a sufficient output power to properly control both sections of tubes 314, 315 and 316 which have their input or control electrodes all connected in parallel.

Condenser 310 and associated grid resistor 311 are so designed that they tend to, in effect, differentiate the square wave form 703 received from the anode of tube 210. Thus, only a very short pulse is applied to the control grids of tubes 312 and 313 each time the output of tube 210 changes from one value to the other value. For example, when the anode of tube 210 changes from a relatively high positive value to a lower positive value a short negative pulse is applied to the grids of tubes 312 and 313. Likewise, when the anode of the tube 210 rises from a relatively low value to a higher positive voltage, a positive pulse of short duration is also applied to control grids of tubes 312 and 313.

Tubes 312 and 313 are biased so that they are normally conducting appreciable current in their anode-cathode circuit and may have their control grids at or near ground potential. Consequently, these tubes do not amplify or even relay the positive pulses applied to their control grids. Thus positive pulses, to the extent that they are repeated by the tubes, appear as negative pulses in the output or anode circuits of these tubes as illustrated at 704 of FIG. 7. The negative pulses however, applied to the control grids of tubes 311 and 312 are amplified and repeated by these tubes and appear as large positive pulses in the output or anode circuits of these tubes as shown at 705 of FIG. 7.

Thus positive pulses, when applied to the control elements of both sections of tubes 314, 315 and 316 will cause the condensers 321, 322, 323, 324, 325 and 326 to all be charged to a voltage substantially equal to the maximum positive voltage applied to the control grids of the corresponding sections of the tubes in response to the positive pulse applied thereto from tubes 312 and 313 through the coupling condenser 317. At the termination of the positive synchronizing pulse all the sections of tubes 314, 315 and 316 cease to conduct due to the bias applied to their control grids and due to the charge on the upper terminal of the corresponding condensers 321 to 326, inclusive. Unless discharged in a manner to be described hereinafter, the potential of the upper terminal condensers 321 to 326 then remain at the relatively high positive potential. If any condensers are discharged, as will be described hereinafter, they are recharged by the next successive positive synchronizing pulse applied to the control elements of tubes 314, 315 and 316 in the manner described above.

The upper terminals of condensers 321 through 326, inclusive, are connected to the anodes of the right-hand section and to the grid or control element of the left-hand section of the respective tubes 331 through 336, inclusive. The left-hand sections of these tubes are biased, by means of potentiometer 327 and biasing battery or other source of biasing potential 328, so that the tubes are normally non-conducting. Consequently, unless a positive pulse is applied to the control grid of the left-hand sections of these tubes they do not tend to change the charge upon the upper terminals of condensers 321 through 326, inclusive.

With the positive potential of the upper terminal of condensers 321 through 326 applied to the control grids of the right-hand sections of tubes 331 through 336, inclusive, these sections are maintained in a conducting condition which in turn causes the potential of the plate of the right-hand sections of tubes 331 through 336, inclusive, to be maintained at a relatively low voltage. The anode voltages of right-hand sections of tubes 331 through 336 are coupled to the screen or other control element of tubes 351 through 356. Consequently, the potential of these grids is normally maintained sufficiently low so that no current can pass in the anode-cathode circuit of these tubes independently of any of the signaling potentials applied to any of the other grids or control elements of these tubes. In other words tubes 351 through 356 will be maintained non-conducting unless and until a more positive potential is applied to their screen grids as will be described hereinafter.

The control grid of the left-hand section of tube 331 is connected to the cathode of tube 123 through a coupling network comprising inductance 340 and condenser 341. As pointed out above, a positive synchronizing pulse is applied to a cathode of tube 123 for each code group of pulse code modulation signals when the exemplary system described herein is operated in the manner assumed above. The inductance 340 tends to delay the application of this positive pulse to the control grid of tube 331 until the termination of the positive pulse applied to the control grids of both sections of tubes 314, 315 and 316. The delayed positive synchronizing pulse is then applied to the control grid of the left-hand section of tube 331 as illustrated by graph 706 shown in FIG. 7. The application of the positive pulse to the control grid of the left-hand section of tube 331 causes this tube to pass current in its anode-cathode circuit and discharge condenser 321 so that its upper terminal is at a relatively low positive potential. As a result the potential of the control grid of the right-hand section of tube 331 is also greatly reduced so that this section now conducts much less current than before. As a result its anode rises to a relatively high positive potential and in turn causes the screen grid of tube 351 to likewise rise in potential. If at this time the control grid of tube 351 is likewise at or above a predetermined potential, a pulse of current flows through the anode resistor 357 common to tubes 351 through 356, inclusive. If, on the other hand, the control grid of tube 351 is more negative at this time, or below a predetermined potential, no such pulse current flows in the output resistor 357.

The above conditions are then maintained, that is, with the upper terminal of condenser 321 discharged, the right-hand section of tube 331 conducting little or not current and the screen of tube 351 maintained at a relatively high positive potential until the next positive pulse is applied to the control grids of both sections of tubes 314, 315 and 316. At this time the upper terminal of condenser 321 is again charged to a relatively high positive voltage with respect to ground which voltage is applied to the control element of right-hand section of tube 331. This section of tube 331 then again conducts current and causes the potential applied to the screen grid of tube 351 to be again reduced to its low value after which time substantially no current can flow in the output circuit of tube 351.

The wave form of the voltage applied to the screen of tube 351 is illustrated by the portion of graph 707, shown in FIG. 7 designated 1.

When the right-hand section of tube 331 again starts to conduct current the potential of its cathode will become more positive and thus apply more positive potential to coupling network comprising inductance 342 and condenser 343. Inductance 342 delays the application of this positive pulse to the control grid of the left-hand section of tube 332 until after the termination of the positive pulse applied to the control grid of tubes 314, 315 and 316. Condenser 343 and resistor 344 in effect, tend to differentiate or shape the pulse applied to the control grid in the left-hand section of tube 332 so that the grid is maintained positive for only a very short instant of time. During the time the control grid of the left-hand section of tube 332 is maintained positive current flows in the anode-cathode path of this tube and discharges condenser 322. As described with respect to tube 331, the right-hand section of tube 332 then ceases to conduct current and in turn causes a high positive potential to be applied to the screen of tube 352 thus permitting this tube to conduct or not depending upon the potential of its control grid.

It should be noted that when the current flows through the right-hand section of tube 332 and is reduced as described above, the potential of its cathode is also reduced which change in potential is applied to the control grid of the left-hand section of tube 333 through coupling network comprising inductance 345, condenser 346 and resistor 347. The left-hand section of tube 333, however, was already biased to or beyond cut-off so that the application of this negative pulse to its control grid produces little or no effect upon the operation of the circuit.

Thus, in the manner described above, each of the tubes 351 to 356 is conditioned to conduct under the control of the potential of this control grid one after another in rotation in synchronism with the pulse intervals of the pulse code modulation pulses which it is desired to encipher.

The control grids of these tubes are connected to switches 371 to 376 respectively, which switches may be set in any one of a plurality of different positions. As shown in the drawings the switches are set to connect each of the control grids to a separate and individual source of key signals 381 to 386 respectively. With switches 371 to 376 set in these positions and switch 658 set in the position shown in the drawing, the output of each of these key generators is employed to encipher every sixth pulse code modulation in accordance with the key signals generated by the respective key generator. Thus the outputs of all six of the key generators are combined and employed to encipher the entire array and pulse modulation pulses. By providing six key generators and employing their outputs for a short time one after another and in sequence, it is possible to provide ample time for changing the outputs of these generators and thus operate the generators at a much slower speed as, for example, one-sixth of the speed of the pulse code modulation pulse intervals. In other words, in the exemplary embodiment described herein wherein six individual and independent key generators 381 to 386 are provided the output of these generators is used only one-sixth of the time so that five-sixths of the time of a complete cycle of the distributing equipment 351 to 356, inclusive, is available for advancing the key generating equipment.

Under certain circumstances it may be desirable to employ a common key generating equipment such as illustrated by 387, FIG. 3. In this case, the switches 371 to 376, inclusive, will be set in the second position from the bottom and switch 377 in middle position as shown in the drawing. Under these circumstances the single common keying equipment 387 is employed to encipher all of the pulses of the pulse code modulation signals.

It is also sometimes desirable to set any one or all of the switches 371 to 376 so that the pulse code modulation pulses may be transmitted without change or merely inverted into pulses of the opposite character. In order to accomplish this the switches 371 to 376, inclusive, will be set at either the third or fourth positions at which time the control grid of the corresponding tubes 351 to 356, inclusive, will be maintained either at constant potential or ground potential. It may be sometimes desirable to simultaneously change the condition of the control grids on all of the tubes. This may be accomplished by control switch 377 together with switches 371 to 376. When the switches 371 to 376 are set in their second position and switch 377 set in either extreme position, pulse code modulation signals will be transmitted without alteration or merely inverted. That is, each pulse is changed to a pulse of the opposite character.

Enciphering

Thus the output of the distributor arrangement appears across the common anode resistor 357. This output is the combined output of all the key generators employed for enciphering the speech wave. This output appears as negative pulses which are applied to the control grid of tube 241. Tube 241 serves to repeat these pulses and invert them so that they appear as positive pulses in its anode circuit. These pulses are then applied to control grid of tube 242 which tube again amplifies, shapes and again inverts the pulses so that they appear as negative pulses in its anode circuit. These negative pulses are again applied to control grid of tube 243 which again inverts the pulses which now appear as positive pulses in the output of the anode circuit of tube 243. The output circuits of tubes 242 and 243 are applied to the screen or other control grids of tubes 235 and 225. It should be noted that when a negative pulse appears across the common anode resistor 357 a positive pulse is applied to the control grid of tube 225 whereas if negative pulse is not present at the common anode resistor 357, a positive pulse is applied to the person or other control grid of tube 235. In other words, pulses of opposite polarity are applied to the screen grids of these two tubes so that only one or the other of the tubes may be conducting at any given time.

Tubes 225 and 235 are normally biased so that in order to permit current control in their anode circuits, positive control must be simultaneously applied to both their control grids and to their screen grids.

Turning now to the pulse code modulation system we will assume that positive pulses are received over the transmission path 204 from the pulse code modulation system 203. It is also assumed that these pulses comprise two signaling conditions, one of which is a positive current or positive potential and is applied to the control grid of tube 221 while the other signaling condition comprises either no current or negative current and thus a lower potential is applied to the control grid of tube 221. It is also assumed that key 338 is set in the position shown in the drawing. The tube 221 serves to amplify the shape and repeat the positive pulses applied to this control grid as negative pulses in its output circuit. As is common in pulse code modulation systems, pulses of positive current applied to the control grid of tube 221 are of relatively short duration. Whereas the absence of any current, that is, pulses of zero signaling condition or the absence of positive current as received in the equipment 203 are not usually of short duration. They merely represent the other signaling condition which exists at all times except when positive pulses are received.

The pulses from the anode circuit of tube 221 are applied to the control grid of tube 222 which repeats these negative pulses to its cathode circuit which applies them to the control grid of tube 231. Tube 231 again amplifies, repeats or when desired further shapes the signaling pulse and in addition inverts them and applies them as positive pulses to the control grid of tube 235. It should be noted that each positive pulse as received over a transmission path 204 causes the application of the positive pulse to the control grid of tube 235.

As pointed out above, the positive pulses are received over transmission path 204 are applied as negative pulses to the control grid of tube 222 which tube serves to amplify and if further desired, further shape these pulses and to repeat them as positive pulses in the anode circuit of tube 222. These positive pulses are applied to the control grid of tube 223 which tube serves to repeat the pulses as negative pulses in this output circuit across resistor 224 connected in its anode circuit.

Resistor 224 is also connected in the anode circuit of tube 211 and thus common to the output circuits of tubes 211 and 223. Tube 211 is normally maintained conducting so that it maintains its anode as well as the anode of tube 223 at a relatively low potential and thus normally preventing any appreciable change in the potential of the anode of tube 223.

The control grid of tube 211 is coupled through coupling network comprising condenser 212, inductor 213 and resistor 214 to the cathode of the repeating and amplifier tube 210. As pointed out above, tube 210 repeats in its anode and also in its cathode circuits the output of the pulse timing generator illustrated by curve 703 in FIG. 7. However, the output in the cathode circuit is of opposite phase to the output in the anode circuit of this tube. The coupling network comprising condenser tube 212, inductance 213 and resistance 214 serves two purposes, (1) to differentiate the output wave form, and (2) to delay the application of pulses to the control grid of tube 211. As a result, negative pulses are applied to the control grid of tube 211 as shown in 750 of FIG. 7. The coupling network comprising condenser 212, inductor 213 and resistor 214 is so designed that the negative pulses applied to the control grid of tube 211 are of substantially the same duration and occur at substantially the same time as the code modulation pulses applied to the control grid of tube 223 in the manner described above.

Thus if a positive pulse is received over transmission path 204 and applied to the control grid of tube 223 as a positive pulse, as described above, at the same time a negative pulse is applied to the control grid of tube 211, substantially no output pulse flows in the combined output circuit of tubes 211 and 213 since these pulses of opposite polarity are adjusted to substantially neutralize or cancel each other in the combined output circuit of these tubes.

However, if no positive pulse is received over the transmission path 204 at the time of the application of a negative pulse to the control grid of tube 211, a negative pulse applied to this grid interrupts or reduces the current flowing in the anode circuit of this tube and thus causes a positive pulse to be transmitted from the combined output circuits of tube 211 and tube 223 and thus applying a postiive pulse to the control grid of tube 225.

Thus it is apparent that in response to a positive pulse received over the transmission path 204 a positive pulse is applied to the control grid of tube 235 and no such pulse is applied to the control grid of tube 225. Likewise, in response to the reception of the pulse of no current or negative current received over the transmission path 204, a positive pulse is applied to the control grid of tube 225 but no such pulse is applied to the control grid of tube 235. In other words, the pulses applied to the control grids of these two tubes are complementary or opposite, in accordance with the pulse code modulation signals received from the pulse code modulating equipment 203.

Tubes 225 and 235 provided with the common output circuit are coupled through the amplifying tubes 226 and 227 to the transmission path 228 extending to the distant station.

As pointed out above, tubes 225 and 235 are normally biased so that they do not pass current in their anode circuits unless positive signaling potentials or pulses are applied simultaneously in both their control grids and screen grids. The pulse code modulation signals are applied oppositely to the control grids of these tubes and the combined key signals from the key generators are applied oppositely to the screen grids of these tubes. In other words the key generator serves to select which polarity of code modulation signals will be transmitted for each pulse.

If the pulse code modulation signals and the key signals are of opposite character or polarity, then no current flows in the output circuit of either tube 225 or 235. As a result, the plate potential of these tubes will remain high, thus maintaining the grid of tube 226 at a relatively high positive potential and the anode of this tube at a relatively low potential so that a pulse of low or negative value is transmitted over the transmission path 228.

If, however, a pulse of the positive polarity is received over the transmission path 204 at the same time a positive pulse, that is, a pulse of no current, appears across the common anode resistor 357 of the key generator, a pulse of current flows in the anode-cathode circuit of tube 235, thus causing the negative pulse to appear across the common anode resistor 236 which pulse is applied to the control grid of tube 226 which repeats it as a positive pulse in this anode circuit, and thus causes a positive pulse to be transmitted through the cathode follower tube 227 and over the transmission path 228.

If, on the other hand, a pulse of no current or negative current is received over the transmission path 204, at the same time a negative pulse appears across the common anode resistor 357 as a result of the combined outputs of all the key generators, the control grid and screen grid of tube 225 will have applied thereto simultaneously pulses of positive polarity which will cause a negative pulse to be repeated in the anode circuit of this tube. This negative pulse is repeated as a positive pulse and transmitted over the transmission path 228 in the manner described above.

Thus it is apparent that when the pulses received from the key generator and from the pulse code modulation system are of like character a pulse current is transmitted over the transmission path 228 whereas when the pulse received from the pulse code modulation system and from the key generating equipment are of opposite character a pulse of no current or of negative current is transmitted over the transmission path 228. Thus, the character of the pulses actually transmitted over the transmission path 228 which represent the pulse modulation pulses are enciphered in accordance with the combined outputs of various key generators employed for generating enciphering key signals.

Deciphering

The circuits and equipment at the receiving station operate in substantially the same manner as the corresponding circuits at the transmitting station. The synchronous pulse generating equipment shown in the upper portion of FIG. 4 operates under control of signals transmitted over synchronizing channel in a manner similar to that shown in FIG. 1 and described above. Likewise, the operation of the pulse timing circuit and equipment shown in the lower portion of FIG. 4 is substantially the same as the similar equipment shown in the lower half of FIG. 1. Inasmuch as these circuits operate in substantially the same manner as described with reference to FIG. 1 it is not even necessary to repeat a detailed description of their operation.

Likewise, the circuit in equipment of FIG. 6 operates in substantially the same manner as the corresponding equipment in FIG. 3. Thus tubes 612 through 616, inclusive, operate to charge the upper terminals of condensers 621 to 626 to positive voltages in substantially the same manner as tubes 312 through 316 operate to charge the upper terminals of condensers 321 to 326, to a positive potential as described hereinbefore. Tubes 631 to 636 operate in substantially the same manner as tubes 331 through 336. As a result tubes 651 to 656 are conditioned one at a time to pass current in their anode-cathode circuits through the common anode or output resistor 657 in accordance with the potential applied to the control grids of tubes 651 to 656.

Thus the key generators 681 to 686, when the switches 671 through 676 are positioned as shown in the drawing, are rendered effective one at a time and in rotation to control the deciphering equipment in substantially the same manner as the key generating equipment 381 to 386 controls the enciphering equipment shown in FIG. 3.

It is understood that the switches 671 through 677 must be set in the same positions as the corresponding switches 371 to 377, in order that the proper deciphering key signals are generating for deciphering the received signals. Of course, if none of the keys 371 to 376 and the corresponding keys 671 through 676 are set in their second position, the position of keys 377 and 677 is without effect upon the operation of the system. Consequently, under the above-described circumstances, these keys 377 and 677 may independently one or the other occupy any one of its three positions as shown in the drawing.

Persons skilled in the art will also readily understand that the synchronizing equipment in the circuits shown in FIGS. 1 and 4 must be accurately synchronized with the pulse code modulation signals and that the distributor equipment in FIG. 6 operate synchronously with the corresponding equipment in FIG. 3 so that when tube 351 is conducting during one signaling interval, tube 651 will be conducting during the corresponding signaling interval at the receiving station. Also, keys 538 and 658 are set in the position shown in the drawing.

The key generators 681 through 686 and 687 at the deciphering point are similar to the key cipher generators 381 through 386 or at least produce a corresponding series of key generators which correspond to the cipher key signals generated by the cipher key generators 381 to 386, inclusive. Likewise, these devices are accurately synchronized with the equipment at the first or enciphering station as described herein. Thus the common key generator 687 will usually be energized, stepped or advanced by means of signals derived from the oscillator shown in FIG. 4. Likewise, under the assumed conditions the key generators 681 through 686 will be advanced by means of oscillators operating at the same rate as the oscillators of the generators 381 through 386 and may be controlled by pulses from the oscillator shown in FIG. 4 after they have passed through the delay device 660 so that the various key generators 681 through 686 will be advanced at one sixth of the pulse interval of time of the pulse code modulation system.

In addition, each one of the key generators 681 through 687 must be accurately synchronized with the corresponding key generators 381 through 387 at the transmitting end of the system. Inasmuch as numerous types of synchronizing equipment are available and may take different forms depending in part at least upon the type of key generator employed, no attempt is made herein to show the details of any synchronizing equipment for synchronizing the respective key generators. It is to be understood, however, that these key generators include such synchronizing equipment which operates in its usual and satisfactory manner to maintain each of the key generating equipments 681 through 687 accurately synchronized with the corresponding key generating equipment shown in FIG. 3. For reference to key generating equipment and methods of controlling or synchronizing such equipment reference is made to my copending application Goodall, Ser. No. 67,209, filing date Dec. 24, 1948, and to the application of Edson-Gleichmann-Mallinckrodt, Ser. No. 675,901, filed June 11, 1946, the disclosures of which applications are hereby made a part of the present application as if fully included herein.

The combined output of all the key generators appears across the common anode generator 657 in the same manner as the combined output of all the key generators shown in FIG. 3 appears across the common output resistor 357. The combined output or key signals employed in deciphering the received signals are amplified and repeated by tubes 541, 542 and 543 in a manner similar to that described above with reference to tubes 241, 242 and 243. The output or anode circuits of tubes 542 and 543 are connected to the screen grids or the respective tubes 535 and 525. Consequently the potentials of these screens are never the same. In response to one type of key pulse, the screen grid of tube 525 will be made more positive while that of tube 535 will be made more negative. In response to a pulse of the opposite character or polarity applied across resistor 657 a negative pulse is applied to the screen of tube 252 and positive pulse is applied to the screen of tube 535.

Likewise, tubes 510 and 511 respond to the code element timing wave form in a manner similar to the responsive tubes 210 and 211 at the transmitting station described above.

Tubes 521, 522 and 523 as well as tube 531 respond to the enciphered pulses received over transmission path 228 in the same manner as tubes 221, 222, 223 and 231 respond to the signals received over the transmission path 204 at the transmitting station. Consequently, the enciphered code signals are applied to the control grids of tubes 525 and 535 in the same or similar manner to the application of signals to the control grids of tubes 225 and 235. Tubes 525 and 535 are provided with the common output resistor 536 and operate in a manner similar to the operation of tubes 225 and 235 described above. In other words, if the key signals and receive signals are the opposite polarities, no change occurs in the combined output circuit of tubes 225 and 235. If, however, both the signal received over the transmission path 228 and from the key generator are positive, an output pulse is repeated in the anode-cathode circuit of tube 535 whereas if both the signaling pulse and the pulse from the key generator are negative, tube 525 repeats a pulse in this anode-cathode circuit. These pulses are then amplified, limited or otherwise shaped by tubes 526 and 527 and with switch 538 set as shown in the drawings, repeated as pulses of current to the pulse code demodulation equipment 503 and then to the terminal equipment 502 to receiving device 501.

The pulse code demodulation equipment 503 may be of any suitable type such as disclosed in either of the above-identified patent applications or any other type of pulse code modulation equipment which will demodulate the pulses generated by modulating equipment 203 and reconstruct the complex wave form being transmitted over the system. Terminal equipment 502 may include any or all of the different types of equipment described above with reference to terminal equipment 202 at the transmitting station. Terminal equipment 502 may be similar to the terminal equipment 202, but may include any suitable type terminal equipment totally or in part different from the terminal equipment 202 at the transmitting station.

In addition, the receiving device 501 is illustrated by a headset which is usually employed to respond to device frequency currents. Any other suitable type of receiving device may be employed as a receiving device 501 which is capable of receiving the type of signals transmitted by the transmitting device 201 at the transmitting station. Inasmuch as both the transmitting device and the receiving device operate in their usual manner when cooperating with the exemplary system set forth herein, detailed description of the operation of the many different types of devices which may be employed to generate suitable signals and respond to receive signals is not given herein in detail.

The various transmission paths for the synchronizing pulses and the pulse code modulation pulses are shown in the drawing as coaxial cables. It is to be understood that the exemplary system set forth herein may work equally well with other types of transmission paths including open-wire lines, cable circuits, carrier current systems, wave guides, and radio channels including radio channels in the ultra-high frequency region where the radio waves exhibit properties similar to the circuit properties of light. The paths may include suitable amplifiers, regenerative repeaters, gain and level control and compensating apparatus as well as terminal and interconnecting equipment. The only requirement of these various transmission channels is that they be capable of transmitting a sufficiently wide frequency band so that the received pulses can be accurately recognized at the receiving terminal of the system.

It is also to be noted that when the same key signals are combined with the pulse code modulation signals in the same manner in tandem, that is, first at one station and then at another, the original pulse code groups are recovered after the second time the signals are combined with the same enciphering key pulses and deciphering key pulses.

Preempt Circuit

The circuit arrangements in accordance with this invention may be employed to preempt certain pulses of a pulse code modulation system and employ these pulses for transmission of another pulse code channel, for the transmission of supervisory signals, for the transmission of telegraph signals, or for the transmission of any other suitable types of signals representing information including pictures, drawings, etc.

In addition, by arranging the various periods or cycles of operation of the circuits and systems in accordance with the present invention relative to the cycle or code group interval of the pulse code modulation systems, secrecy may be provided for the added transmission channel without materially detracting from the quality or secrecy from the pulse code modulation or channels. Furthermore, as pointed out above, the equipment in accordance with this invention may be located at the same place as the pulse code modulation equipment or it may be located some distance therefrom. It is not essential for either the ciphering or deciphering or the preempt circuits to be located at any specified position relative to the pulse code modulation system other than inserted in or connected to the main transmission path. As shown in the drawing, the circuit is arranged to preempt one code pulse per cycle of operation of the distributor equipment shown in FIGS. 3 and 6. Of course, any number of pulses may be preempted during such a cycle and the time between the preempted pulses may be extended to any desired amount by merely extending the number of tubes of stages in the distributor shown in FIG. 3 as is well understood.

An auxiliary signal source is indicated in the drawings by a rectangle 388 which signal source may be similar to the source 201 or it may be of any other suitable type. These two sources do not have to be of the same type.

In order to employ the preempt circuit and transmit signals from the auxiliary equipment 388 over the pulse code modulation transmission system, switch arm 388 is moved into contact with switch terminal 339 and switch arm 376 is moved to its uppermost position where the output from the auxiliary signal equipment 388 is applied to the control grid of tube 356.

Thus, during each cycle of operation of the distributor equipment the screen grid or other control element of tube 356 is raised to a relatively high positive value in the manner described above so tube 356 will conduct current under control of the signals applied to the control grid, which under the assumed conditions with switch 376 moved to its uppermost position, will be from the auxiliary signal source 388. These signals are repeated by tube 356 at this time and appear across the output of resistor 357 in the manner described above.

It will be recalled that when tube 356 is conditioned to repeat the signals applied to its control grid, condenser 326 is discharged due to the positive pulse applied to the control element of the left-hand section of tube 336. With the upper terminal of condenser 336 discharged, the potential applied to the control grid of the right-hand section of tube 336 is reduced so that a more positive voltage is applied to the screen or control element of tube 356 connected thereto. In addition, the more positive voltage is applied to the control element of the grid of tube 337 at this time with the result that tube 337 conducts more current in its anode-cathode circuit and thus reduces the potential of its anode, this reduced anode potential is applied to the screen or one of the control grids of tube 221 thus preventing this tube from responding to any pulse code modulation pulses at this time. At other times when switch 338 is set in a position in contact with terminal 339, tube 337 is not conducting appreciable current in its anode-cathode path with the result that a sufficiently high voltage is applied to the screen or other control element of tube 321 to permit this tube to operate as an amplifier or repeating tube and repeat the pulses to tube 222 and then through the circuits in the manner described above. However, when it is desired to preempt such a pulse, the voltage applied to the control element of tube 221 is such that the tube will not pass any further pulse code modulation signals even though they are applied to its control grid. In other words, the output of tube 221 is always spacing or of a more positive voltage at these times. Consequently, the signals from the auxiliary equipment 338 will control the character of the pulse transmitted through tube 356 which pulse is applied to the control grid of tube 241 and then combined with the spacing pulse from code modulation system in the manner described above. Pulses are then amplified, clipped or otherwise shaped by tubes 226 and 227 and then transmitted over the pulse code modulation transmission path to the receiving station.

When it is desired to receive the information conveyed by the preempted pulses, switches 658 and 538 are moved to engage their other contacts. Switch 676 is moved to engage the positive battery terminal at this time.

Under these conditions, the output code modulation pulses from tube 527 are applied to the control grids of the right-hand sections of tubes 536 and 544. Normally these pulses are repeated by the right-Hand section of tube 536 to the left-hand section of tube 537. The pulses are then repeated by the output or right-hand section of tube 537 and applied to the pulse code modulation system 503 through switch 538 when it is moved to the opposite position from that shown on the drawing. It should be noted at this time that the potential applied to the control grid of the left-hand section of tube 536 is such that the right-hand section of this tube operates as an amplifier whereas the potential applied to the left-hand section of tube 544 is more positive so that tube 544 will not operate as an amplifier at this time. These potentials are derived from the right-hand section of tube 557.

With switch 558 moved to engage opposite contact from that shown in the drawing, a relatively high voltage is applied to the control grid of the left-hand section of tube 657, thus causing substantial saturation current to flow in the anode-cathode section of the left-hand section of tube 657. As a result, the anode of this tube is at a relatively low voltage which voltage is applied to the control element of the right-hand section of tube 557. The right-hand section of tube 557 operates as a phase reversing tube. When a relatively low voltage is applied to its control grid a relatively small amount of current flows through its anode-cathode circuit; consequently, the cathode of this tube is at a relatively low voltage while the anode is at a relatively high voltage. The cathode is connected to the control element of a left-hand section of tube 536 and since it is of relatively low voltage at this time the right-hand section of tube 536 operates as a repeating and amplifier tube as described above. The control element of the left-hand section of tube 544 is connected to the anode of the right-hand section of tube 657. The voltage of this anode is at a relatively high positive value as described above; consequently, the grid of the left-hand section of tube 544 is also at a relatively high voltage which causes a large current to flow in the anode-cathode circuit of the left-hand section of tube 544. As a result, the voltage of the cathode of the left-hand section of tube 544 is at a relatively high positive value. This high positive voltage is above the normal grid bias applied to the right-hand section of tube 544 and also above the most positive signaling voltage applied to its grid at this time. As a result, the right-hand section of tube 544 is cut off and does not repeat the signals applied to its control element in its output circuit.

Once during each cycle of operation of the distributor equipment shown in FIG. 6, tube 656 is conditioned to conduct in the manner described above. Furthermore, tube 656 conducts during the same portion of the distributor cycle as does tube 356 at the other end of the ciphering or preempt equipment of the section of the transmission path. When the preempt circuit is employed switch 676 is moved to engage the positive battery terminal so tube 656 conducts during each cycle of the distributor circuit. When tube 656 conducts, its anode voltage falls to a relatively low value and thus interrupts the current flowing through the left-hand section of tube 657 which in turn causes the anode of this tube to rise to a relatively high positive value. This voltage is repeated as a positive voltage on the cathode of the right-hand section of tube 657 and as a negative voltage on the anode of this section of tube 657. As a result, a positive voltage is applied to the control element of the left-hand section of tube 536 which voltage is sufficient to raise a cathode of the right-hand section of this tube so that the right-hand section will not repeat the pulse code modulation pulses to the receiving equipment through tubes 536 and 537 in the manner described above. Instead, a more negative voltage is applied to the control element of the left-hand section of tube 544; the voltage of the cathode of this section and thus the voltage of the cathode of the right-hand section of tube 544 are of such a value that the right-hand section of tube 544 repeats the pulse to tube 545. Tube 545 limits, amplifies and otherwise shapes the wave form of the pulse and repeats it to the auxiliary equipment 546 which auxiliary equipment must be designed to receive the type of signals obtained from the auxiliary equipment at the other station.

It is apparent that any desired number of the pulse intervals of the pulse code modulation system may be preempted and these pulse intervals employed to transmit auxiliary signals which signals may be derived from any suitable signaling source. These signals are then transmitted over the pulse code modulation system and separated therefrom and employed to control a desired suitable type of signaling equipment.

What is claimed is:

1. A pulse code modulation system including a source of intelligence conveying code groups or pulse elements of pulse code modulated signals, apparatus for suppressing individual pulse elements of said code groups or pulse elements of said pulse code modulated signals at recurring intervals of time, means for transmitting other signals during said intervals during which said pulses are suppressed, and receiving apparatus for recovering said other signals from said pulse code modulation signals.

2. In a pulse code modulation communication system in which intelligence conveying code groups of pulse elements are transmitted over a transmission path and in which each code group of pulse elements represents the instantaneous amplitude of an intelligence conveying signaling wave, pulse responsive apparatus responsive to pulses transmitted over said path, means cooperating with said pulse responsive apparatus for suppressing individual pulse elements of said intelligence conveying code groups of pulse elements at recurring instants of time, means for transmitting other signals over said path during said intervals during which said pulses are suppressed and receiving apparatus for recovering said other signals transmitted over said path.

3. A pulse code modulation system including a transmission path in which intelligence conveying code groups of pulse elements pulse code modulated signals are transmitted over said transmission path, apparatus cooperating with said path for suppressing at recurring instants of time individual pulse elements of said code groups of pulse elements of said pulse modulated signals means cooperating with said path for transmitting other signals thereover during the intervals of time during which said pulses are suppressed, receiving apparatus for recovering the intelligence conveyed by said pulse code groups of pulse elements of said pulse code modulation signals, and other receiving means for recovering said other signals.

4. In a pulse code modulation system in combination, a source of high-speed pulse code modulated signals having a plurality of code groups of pulse elements in which each group comprises a predetermined number of pulse elements transmitted in succession and in which each code group of pulse elements represents the amplitude of a complex signaling wave at the discrete instant of time, a plurality of independent key cipher generators equal in number to the number of pulse elements in each code group of pulse elements, electron distributor means, apparatus for synchronizing said distributor means with said pulse code modulation signals, other synchronizing means for individually actuating each of a plurality of said key cipher generators separately at different times relative to said pulse code modulated code groups of pulse elements and apparatus including electronic gate circuits for combining successive pulse elements of each of said code groups of pulse elements with pulse elements from successive ones of said cipher key generators.

5. In a pulse code modulation system in combination, a source of high-speed pulse code modulated signals having a plurality of code groups of pulse elements in which each group comprises a predetermined number of pulse elements transmitted in succession and in which each code group of pulse elements represents the amplitude of a complex signaling wave at a discrete instant of time, a plurality of independent key cipher generators different in number from the number of pulse elements in each code group of pulse elements, electron distributor means, apparatus for synchronizing said distributor means with said pulse code modulation signals, other synchronizing means for individually actuating each of a plurality of said key cipher generators in sequence at different times relative to said pulse code modulated code groups of pulse elements and apparatus including electronic gate circuits for combining successive pulse elements of each of said code groups of pulse elements with pulse elements from successive ones of said cipher key generators.

6. In a pulse communication system in combination, a source of high-speed pulse code modulated signals having a plurality of code groups of pulse elements in which each group of pulse elements has a predetermined number of pulse elements transmitted in succession and in which each code group of pulse elements represents the amplitude of a complex signaling wave at a discrete instant of time, a plurality of separate and discrete cipher key generators, each for generating a separate random sequence of pulse elements, electronic distributor means, electronic apparatus for synchronizing said distributing means with said pulse code modulated signals, electronic means for combining successive pulse elements of said pulse code modulation signals with pulse elements of successive ones of said key cipher generators, other synchronizing means for individually and successively advancing said key cipher generates one after another in synchronism with said pulse code modulated signals.

7. In a pulse communication system in combination, a source of high-speed pulse code modulated signals having a plurality of code groups of pulse elements in which each group of pulse elements has a predetermined number of pulse elements transmitted in succession and in which each code group of pulse elements represents the amplitude of a complex signaling wave at a discrete instant of time, a plurality of separate and discrete cipher key generators, each for generating a separate random sequence of pulse elements, electronic distributor means, electronic apparatus for synchronizing said distributing means with said pulse code modulated signals, electronic means for combining successive pulse elements of said pulse code modulation signals with pulse elements of successive ones of said key cipher generators, other synchronizing means for individually and successively actuating said key cipher generators in rotation in synchronism with said pulse code modulated signals, to successively cause the outputs of said key cipher generators to change or not to change at different times relative to said pulse code modulated signals in accordance with the key cipher signals being generated by the respective key cipher generators.

8. In a pulse code modulation communication system in combination, a source of pulse code modulated signals comprising code groups of pulse elements in which each code group of pulse elements represents the instantaneous amplitude of a complex signaling wave, a plurality of independent sources of enciphering key signals, apparatus for employing said key signals from each of said sources in succession for enciphering pulse code modulation signals, deciphering means comprising a similar plurality of independent deciphering sources of deciphering key signals which deciphering sources generate signals identical with corresponding key signals generated by said sources of enciphering key signals, and electronic apparatus for combining said enciphered signals with signals from said corresponding sources of deciphering key signals in a succession corresponding to the succession in which enciphering signals from corresponding ones of said enciphering sources are employed for enciphering said pulse code modulation signals and synchronizing means for synchronously advancing corresponding ones of said enciphering and deciphering sources and at the same time relative to said pulse code modulation signals and at times different from the times at which other corresponding enciphering and deciphering sources are synchronously advanced.

9. In a pulse code modulation system a source of pulse code modulated signals, comprising code groups of pulse elements, means for decoding said signals, apparatus located intermediate said source and said means for decoding said signals for preempting one pulse element fo individual code groups of said pulse code modulation signals at predetermined instants of time, apparatus for transmitting other signals during said preempted pulse intervals and other equipment for recovering said other signals from said pulse code modulation signals.

* * * * *